(12) United States Patent
Fernandez

(10) Patent No.: US 7,599,963 B2
(45) Date of Patent: Oct. 6, 2009

(54) NETWORK-EXTENSIBLE RECONFIGURABLE MEDIA APPLIANCE

(76) Inventor: Dennis S. Fernandez, 1175 Osborn Ave., Atherton, CA (US) 94027

(*) Notice: Subject to any disclaimer, the term of this patent is extended or adjusted under 35 U.S.C. 154(b) by 113 days.

(21) Appl. No.: 11/203,645

(22) Filed: Aug. 11, 2005

(65) Prior Publication Data

US 2008/0163287 A1  Jul. 3, 2008

Related U.S. Application Data

(63) Continuation of application No. 10/448,202, filed on May 28, 2003.

(51) Int. Cl.
*G06F 17/30* (2006.01)

(52) U.S. Cl. ........................ 707/104.1; 707/3

(58) Field of Classification Search .................. 463/42; 375/240.12; 348/722, 155, 156; 358/52; 707/1, 104.1, 3

See application file for complete search history.

(56) References Cited

U.S. PATENT DOCUMENTS

| | | | |
|---|---|---|---|
| 4,390,603 A | 6/1983 | Kawana et al. | |
| 5,259,040 A | 11/1993 | Hanna | |
| 5,806,053 A | 9/1998 | Tresp et al. | |
| 5,917,958 A * | 6/1999 | Nunally et al. | 382/276 |
| 6,016,380 A * | 1/2000 | Norton | 386/52 |
| 6,526,491 B2 | 2/2003 | Suzuoki et al. | |
| 6,585,521 B1 * | 7/2003 | Obrador | 434/236 |
| RE38,432 E * | 2/2004 | Fai et al. | 434/350 |
| 6,690,424 B1 | 2/2004 | Hanagata et al. | |
| 6,700,640 B2 | 3/2004 | Morley et al. | |
| 6,809,734 B2 | 10/2004 | Suzuoki et al. | |
| 6,850,252 B1 | 2/2005 | Hoffberg | |
| 6,888,568 B1 | 5/2005 | Neter | |
| 6,980,596 B2 | 12/2005 | Wang et al. | |
| 7,102,669 B2 | 9/2006 | Skow | |
| 2001/0010493 A1 * | 8/2001 | Script et al. | 340/546 |
| 2001/0043219 A1 | 11/2001 | Robotham et al. | |
| 2002/0053083 A1 * | 5/2002 | Massey | 725/46 |

(Continued)

FOREIGN PATENT DOCUMENTS

JP  A-H-08-279922  10/1996

(Continued)

OTHER PUBLICATIONS

Gleicher et al., "A Framework for Virtual Videography", International Symposium on Smart Graphics, [online], Jun. 11-13, 2002 [retrieved on Mar. 3, 2009]. Retrieved from Internet: <URL: http://portal.acm.org/ft_gateway.cfm?id=569007&type=pdf&coll=ACM&dl=ACM&CFID=25134711&CFTOKEN=38795974>.*

(Continued)

*Primary Examiner*—Jean B. Fleurantin
*Assistant Examiner*—Dennis Myint
(74) *Attorney, Agent, or Firm*—Fernandez & Associates, LLP

(57) ABSTRACT

Extensible reconfigurable media appliance for security and entertainment captures images digitally for storage. Digital effects and filters are applied to incoming video stream on-the-fly or to video data stored in memory. Digital effects and filters are dynamically stored, modified, updated or deleted, providing extensible reconfigurable effects studio. Digital media appliance communicates wirelessly with other media appliances, computers, security systems, video storage, email, chat, cellular services or PDAs to provide seamless integration of captured video stream.

4 Claims, 9 Drawing Sheets

U.S. PATENT DOCUMENTS

| | | | |
|---|---|---|---|
| 2002/0054244 A1* | 5/2002 | Holtz et al. | 348/722 |
| 2002/0170062 A1 | 11/2002 | Chen et al. | |
| 2002/0190991 A1* | 12/2002 | Efran et al. | 345/475 |
| 2003/0085992 A1 | 5/2003 | Arpa et al. | |
| 2003/0086686 A1* | 5/2003 | Matsui et al. | 386/52 |
| 2003/0098957 A1 | 5/2003 | Haldiman | |
| 2003/0130993 A1 | 7/2003 | Mendelevitch et al. | |
| 2003/0149569 A1 | 8/2003 | Jowitt et al. | |
| 2003/0185301 A1* | 10/2003 | Abrams et al. | 375/240.12 |
| 2003/0187924 A1* | 10/2003 | Riddle | 709/204 |
| 2003/0224857 A1* | 12/2003 | Baerlocher | 463/42 |
| 2004/0003400 A1 | 1/2004 | Carney et al. | |
| 2004/0027368 A1 | 2/2004 | Snyder et al. | |
| 2004/0027369 A1 | 2/2004 | Kellock et al. | |
| 2004/0061804 A1* | 4/2004 | Favrat et al. | 348/554 |
| 2004/0103225 A1* | 5/2004 | McAlpine et al. | 710/52 |
| 2004/0105004 A1* | 6/2004 | Rui et al. | 348/159 |
| 2004/0151242 A1 | 8/2004 | Chang | |
| 2004/0154043 A1 | 8/2004 | Roman | |
| 2004/0193483 A1* | 9/2004 | Wolan | 705/14 |
| 2004/0218902 A1* | 11/2004 | Yanagita | 386/52 |
| 2004/0220798 A1 | 11/2004 | Chi et al. | |
| 2004/0226051 A1 | 11/2004 | Carney et al. | |
| 2005/0091305 A1 | 4/2005 | Lange et al. | |
| 2006/0038923 A1 | 2/2006 | Dinwiddie | |

FOREIGN PATENT DOCUMENTS

| | | |
|---|---|---|
| JP | A-H-10-210365 | 8/1998 |
| JP | A-2002-319270 | 10/2002 |
| JP | A-2003-006052 | 1/2003 |
| JP | 2004-022716 | 1/2004 |

OTHER PUBLICATIONS

Mey et al., "A Multimedia Component Kit" [oneline], Sep. 1993, [retrieved on Mar. 3, 2009]. Retrieved from Internet: <URL: http://portal.acm.org/ft_gateway.cfm?id=168406&type=pdf&coll=ACM&dl=ACM&CFID=25134711&CFTOKEN=38795974>.*

Crossbow Technology, Inc., MICA Wireless Measurement System Datasheet, San Jose, CA 95134-2109, USA.

Crossbow Technology, Inc., Application Information—About Mote Hardware, San Jose, CA 95134-2109.

Crossbow Technology, Inc., Application Information—About TinyOS, San Jose, CA 95134-2109.

Jason Hill and David Culler, A wireless embedded sensor architecture for system-level optimization.

Anthony Daniels, Zarlink Semiconductor The Multimedia Home Platform: Creating A Multimedia World In the STBhttp://www.commsdesign.com/story/OWG20020918S001, Sep. 18, 2002.

Raman Kumar, Vatssla Gambhirr, Prabhjot Arora, Rahul Parmar, Hazim Ansari, PatentMetrixDigital Rights Management Systems, Apr. 2003, vol. 1, pp. 1, 4, 6, 7, 13, 21.

Cristina Clapp, Avica Technology's Digital Cinema Strategy http://www.uemedia.com/CPC/printer_6557.shtml Apr. 1, 2003.

Avica Technology Corporation, Avica Technology Corporation Fact Sheet wwwavicatech.com/pdf/Avica_Fact_Sheet.pdf.

Sony To Invest Billions In Next-Generation Entertainment Chip http://www.crn/com/sections/BreakingNews/breakingnews.asp?ArticleID=41429 Apr. 21, 2003.

John Walko, Streamed video and data delivered over DAB to mobiles http://www.commsdesign.com/story/OEG20030410S0008, Apr. 10, 2003.

SCRI, 2002-2007 DTV Migration Trends Report—Global Production / Post http://www.scri.com/sc_hdtv_2002trendsnb.html.

SCRI, 2002-2007 DTV Migration Trends Report—US TV Stations http://www.scri.com/sc_hdtv_2002trends.html.

SCRI, 2002 Global Digital Media Facility Trends Report http://www.scri.com/2002facility.html.

SCRI, 2002 Broadcase/Pro Video Product Reports http://www.scri.com/sc_bpvm_2002products.html.

SCRI, 2002 Pro DVD Usage & Products / Brands Report http://www.scri.com/2002prodvd.html.

SCRI, Broadcast/Pro Video Brand Awareness and Ratings http://www.scri.com/brands2002.html.

SCRI, 2002-2004 Global Streaming Media Marketplace Trends Report http://www.scri.com/sc_sm_2002trends.html.

Tensilica Inc., Xtensa Architecture and Performance, Sep. 2002 www.tensilica.com/Xtensa_white_paper.pdf.

Pixim Inc., Pixim D2000 Video Imaging System for Advanced CCTV Cameras Publication PB-D2000-2003-02 Mountain View, CA 94043.

Pixim Inc., Pixim D1000 Video Imaging System for CCTV Cameras Publication PB-D1000-2003-02 Mountain View, CA 94043.

Pixim Inc., Pixim Digital Pixel System Technology Backgrounder, 2003 http://www.pixim.com/technology/technology.phtml.

Pixim Inc., Platform Tools, 2003 http://www.pixim.com/products/platform.html.

Patrick Mannion, EE Times, ZigBee gets push from chips and startups http://www.commsdesign.com/story/OEG20030416S0023 Apr. 16, 2003.

Junko Yoshida, EE Times, LSI Logic bids for H.264 market with VideoLocus acquisition http://www.eetimes.com/story/OEG20030416S0027.

Carlos Garza, RIAA, Music Industry Integrated Identifers Project (MI3P) and MPEG-21 Jan. 2003.

Kari Jaaskelainen, Strategic Questions in the Development of Interactive Television Programs Dissertation, ILMARI design publications.

SMPTE, The SMPTE Journal Abstracts of Papers, 2003.
SMPTE, The SMPTE Journal Abstracts of Papers, Jan. 1999.
SMPTE, The SMPTE Journal Abstracts of Papers, Feb. 1999.
SMPTE, The SMPTE Journal Abstracts of Papers, Apr. 1999.
SMPTE, The SMPTE Journal Abstracts of Papers, May 1999.
SMPTE, The SMPTE Journal Abstracts of Papers, Jun. 1999.
SMPTE, The SMPTE Journal Abstracts of Papers, Jul. 1999.
SMPTE, The SMPTE Journal Abstracts of Papers, Aug. 1999.
SMPTE, The SMPTE Journal Abstracts of Papers, Sep. 1999.
SMPTE, The SMPTE Journal Abstracts of Papers, Oct. 1999.
SMPTE, The SMPTE Journal Abstracts of Papers, Nov. 1999.
SMPTE, The SMPTE Journal Abstracts of Papers, Dec. 1999.
SMPTE, The SMPTE Journal Abstracts of Papers, 2000.
SMPTE, The SMPTE Journal Abstracts of Papers, Jan. 2000.
SMPTE, The SMPTE Journal Abstracts of Papers, Feb. 2000.
SMPTE, The SMPTE Journal Abstracts of Papers, Mar. 2000.
SMPTE, The SMPTE Journal Abstracts of Papers, Apr. 2000.
SMPTE, The SMPTE Journal Abstracts of Papers, Jun. 2000.
SMPTE, The SMPTE Journal Abstracts of Papers, Jul. 2000.
SMPTE, The SMPTE Journal Abstracts of Papers, Aug. 2000.
SMPTE, The SMPTE Journal Abstracts of Papers, Sep. 2000.
SMPTE, The SMPTE Journal Abstracts of Papers, Oct. 2000.

Ranjay Gulati, Chapter 7 Interactive Television www.ranjaygulati,com/new/research/c04.pdf.

Lawrence A. Rowe, University of California at Berkeley, The Future of Interactive Television, Aug. 30, 2000.

Sarnoff Corporation, IP Cores http://www.sarnoff.com/products_services/semiconductor_ip/silicon_strategies/ip_cores/index.asp.

Pentek, Digital Receivers Bring DSP to Radio Frequencies http://www.pentek.com/Tutorials/DF_Radio/DF_Radio.htm.

http://robotics.eecs.berkeley.edu/~pister//SmartDust/in2010.

Yoshiko Hara, EE Times NTT shows single-chip high-definition video codec http://www.eetimes.com/story/OEG20030214S0023.

John Fortt, From Demo: 10 technologies to watch http://www.siliconvalley.com/mld/siliconvalley/business/technology/personal_technology/5222950.htm.

UCLA Center for Communication Policy, The UCLA Internet Report Surveying the Digital Future Year 3.

Howard UNNA Digital Interactive Television loved or abandoned? IPA, Jan. 2002.

Adam Gelles, 4th Dimensino Interactive Inc., Myers Mediaeconomics T-Commerce Business Model NYC 10016.

Advanced Television Systems Committee New Showing: DTV in Canada News From ATSC vol. Three, Issue Three, Oct. 2002.

ITV—The Medium of All Mediums? www.interactivehq.org/councils/amc/iTVStudy.pdf.
Jerry Bennington, Secretary ATVEF & CableLabs Executive Consultant, USA Challenges in Building a New Television Paradigm.
Jane Black, Business Week Hollywood's Digital Love/Hate Story.
Willsearch, Inc., Millenium Multimedia Leader.
Jessica Hundley, Director's Guide to Digital Video, Acting for DV http://www.sonyusadvcam.com/content/printer_36.shtml.
Dean Takahashi, Mercury News, $1,700 remote built to control home of the future.
Intel Corporation, Intel Technology Journal—Interoperable Home Infrastructure vol. 06, Issue 04, Nov. 15, 2002, ISSN 1535-766X.
David L. Hayes, Fenwick & West LLP Advanced Copyright Issues on the Internet.
Drew Dean, SRI International Computer Science Laboratory Digital Rights Management: A Contrarian's View.
Berkeley Conference on Law and Technology of DRM Systems DRM Technology Tutorial Feb. 27, 2003.
Edward W. Felten, Dept. of Computer Science, Princeton University DRM Black Boxes, and Public Policy.
John Erickson, HP Labs, Vermont Policy enforcement vs. the free flow of information.
Drian A. Lamacchia, Microsoft Corporation DRM Policy and Rights Expression on the Trusted Platform of the Future.
Richard D. Rose, Connecting the docs: Navigating the laws and licensing requirements of the Internet music revolutio.
Semiconductor Business News, Toshiba develops fuel cell for notebooks http://www.siliconstrategies.com/story/OEG20030304S0048.
Dean Takahashi, Mercury News Sony chip to transform video-game industry.
George Leopold, EE Times Bill would add copy protection to DTV receivers, Sep. 20, 2002.
Matthew Gast, AirMagnet Seven Security Problems of 802.11 Wireless Dec. 2002, Mountain View, CA 94043.
Michael A. Hiltzik, Digital Cinema Take 2 MIT Technology Review, Sep. 2002.
Sarnoff Corporation, About Sarnoff Silicon Strategies http://www.sarnoff.com/products_services/semiconductor_ip/silicon_strategies/about.asp.
Junko Yoshida, EE Times Interface issues loom for full-featured phones http://www.eetimes.com/story/OEG20030217S0016 Feb. 17, 2003.
Semiconductor Business News, Sarnoff offers digital video manipulation cores http://www.semibiznews.com/story/OEG20030130S0009 Jan. 30, 2003.
Semiconductor Business News, Pictos rolls out new CMOS image sensor http://www.semibiznews.com/story/OEG20030130S0009 Mar. 3, 2003.
Consumer Electronics Association, 5 technologies to watch Oct. 2002.
Atheros Communications, Building A Secure Wireless Network How Atheros Defines Wireless Network Security Today And In The Future 2003.
Loring Wirbel, EE Times Consumer, wireless could be optical saviors http://www.commsdesign.com/story/OEG20030326S0018 Mar. 26, 2003.
Robert Keenan, EE Times ChipWrights optimizes processor for digital cameras http://www.eetimes/com/story/OEG20030210S0045 Feb. 10, 2003.
Junko Yoshida, EE Times Philips' Silicon Hive to develop IP cores http://www.eetimes.com/story/OEG20030314S0013 Mar. 16, 2003.
Bermai, 7200 Series Wireless Systems-on-Chip IEEE 802.11a with 802.11b Interface for Combo Solutions 2002.
Junko Yoshida, EE Times Camera-phones take hold as digital imaging platform http://www.eetimes.com/story/OEG20030210S0025 Feb. 10, 2003.
Bob Tourtellotte, Reuters Imax, Lucas Team Up for Giant 'Star Wars' Movie Sep. 9, 2002.
Imax Ltd., Imax The 15/70 Filmmaker's Manual 1999.
Legal Infrastructure for Certification Authorities and Secure Electronic Commerce Digital Signature Guidelines Aug. 1, 1996.
Tobias Hollerer, John Pavlik, Columbia University Situated Documentaries: Embedding Multimedia Presentations in the Real World IEEE 1999.
Adobe A Manager's Introduction to Adobe eXtensible Metadata Platform, The Adobe XML Metadata Framework.
Raymond Chan, Emily Reyna, Matt Rubens, Annie Wu, Stanford University Pornography and Technology http://www.stanford.edu/~mrubens/pornsite2/technology.htm.
Edrolfo Leones, Director of Global Media Asset Stragegies. The Walt Disney Company, "Applying Metadata Practices" http://www.uemedia.com/eam/pdf/LeonesEAM2003.pdf.
"DTV Application Software Environment Level 1 (DASE-1)", Part 1: Introduction, Architecture, and Common Facilities, ATSC Standard, Advanced Television System Comitte. http://www.atsc.org/standards/a100.zip.
"DTV Application Software Environment Level 1 (DASE-1)", Part 2: Declarative Applications and Environment, ATSC Standard http://www.atsc.org/standards/a100.zip.
DTV Application Software Environment Level 1. (DASE-1), Part 3: Procedural Applications and Environment http://www.atsc.org/standards/a100.zip.
"DTV Application Software Environment Level 1 (DASE-1)", Part 4: Application Programming Interface http://www.atsc.org/standards/a100.zip.
"DTV Application Software Environment Level 1 (DASE-1)", Part 5: Zip Archive Resource Format http://www.atsc.org/standards/a100.zip.
DTV Application Software Environment Level 1 (DASE-1) Part 6: Security; http://www.atsc.org/standards/a100.zip.
DTV Application Software Environment Level (DASE-1) Part 7: Application Delivery System—Arm Binding http://www.atsc.org/standards/a100.zip.
DTV Application Software Environment Level 1 (DASE-1) Part 8: Conformance; http://www.atsc.org/standards/a100.zip.
U.S. Appl. No. 10/448,202, filed May 28, 2003, Fernandez, Dennis.
Video-On-Demand: Taping Deeper Wells, Chaos Media Networks, www.chaosmedianetworks.com Jan. 2002, Santa Clara, CA.
U.S. Appl. No. 11/831,758, filed Jul. 31, 2007, Fernandez, Dennis.
U.S. Appl. No. 11/831,777, filed Jul. 31, 2007, Fernandez, Dennis.
U.S. Appl. No. 11/836,064, filed Aug. 8, 2007, Fernandez, Dennis.
U.S. Appl. No. 11/836,658, filed Aug. 9, 2007, Fernandez, Dennis.
U.S. Appl. No. 11/836,668, filed Aug. 9, 2007, Fernandez, Dennis.
U.S. Appl. No. 11/934,678, filed Nov. 2, 2007, Fernandez, Dennis
U.S. Appl. No. 11/934,707, filed Nov. 2, 2007, Fernandez, Dennis.
U.S. Appl. No. 11/934,712, filed Nov. 2, 2007, Fernandez, Dennis.
U.S. Appl. No. 12/114,160, filed May 2, 2008, Fernandez, Dennis.
U.S. Appl. No. 12/238,686, filed Sep. 26, 2008, Fernandez, Dennis.
U.S. Appl. No. 11/585,508, filed Oct. 23, 2006, Fernandez, Dennis.

* cited by examiner

NETWORK-EXTENSIBLE RECONFIGURABLE MEDIA APPLIANCE

CROSS-REFERENCE TO RELATED APPLICATION

This application is a continuation of the U.S. patent application Ser. No. 10/448,202 filed on May 28, 2003.

BACKGROUND

1. Field

Invention relates to electronic media devices and processing methods, particularly to networked reconfigurable media appliance.

2. Related Art

Conventional digital video media appliances rely on external computing resources for post-processing of recorded audio or video signals, since limited on-appliance editing and filtering capabilities may render such tasks impractical. Furthermore, limited on-appliance software extensibility and limited communication with external resources leave conventional digital media appliances as standalone audio or video recording tools limited by factory-loaded on-appliance processing capacity.

Accordingly, there is need for network-extensible and easily reconfigurable media appliance capable of communicating over networks and allowing for extension of on-appliance audio or video processing software and tagging of recorded audio or video signals.

SUMMARY

Network-extensible reconfigurable media appliance senses incoming audio and/or video, and encodes and stores in media appliance memory or alternatively relays over network to recipient. On-appliance digital audio and/or video effects and filters process audio and/or video data stored in memory, as well as incoming audio and/or video stream on-the-fly. Media appliance dynamically stores, modifies, updates and deletes on-appliance set of digital effects and filters, providing mobile extensible reconfigurable effects studio. Media appliance communicates wirelessly and/or over-wire with other media appliances, computers, security systems, video storage, Global Positioning System (GPS) services, Internet, cellular services and/or personal digital assistants (PDA) providing seamless integration of captured audio and/or video stream with off-appliance resources and/or services. Audio and/or video, wireless, biometric and GPS input and/or output as well as on-appliance acceleration detector render media appliance suitable for security applications. Extensible reconfigurable on-appliance effects and filters studio render media appliance for entertainment and video production or editing applications.

DETAILED DESCRIPTION

Figure 1A:
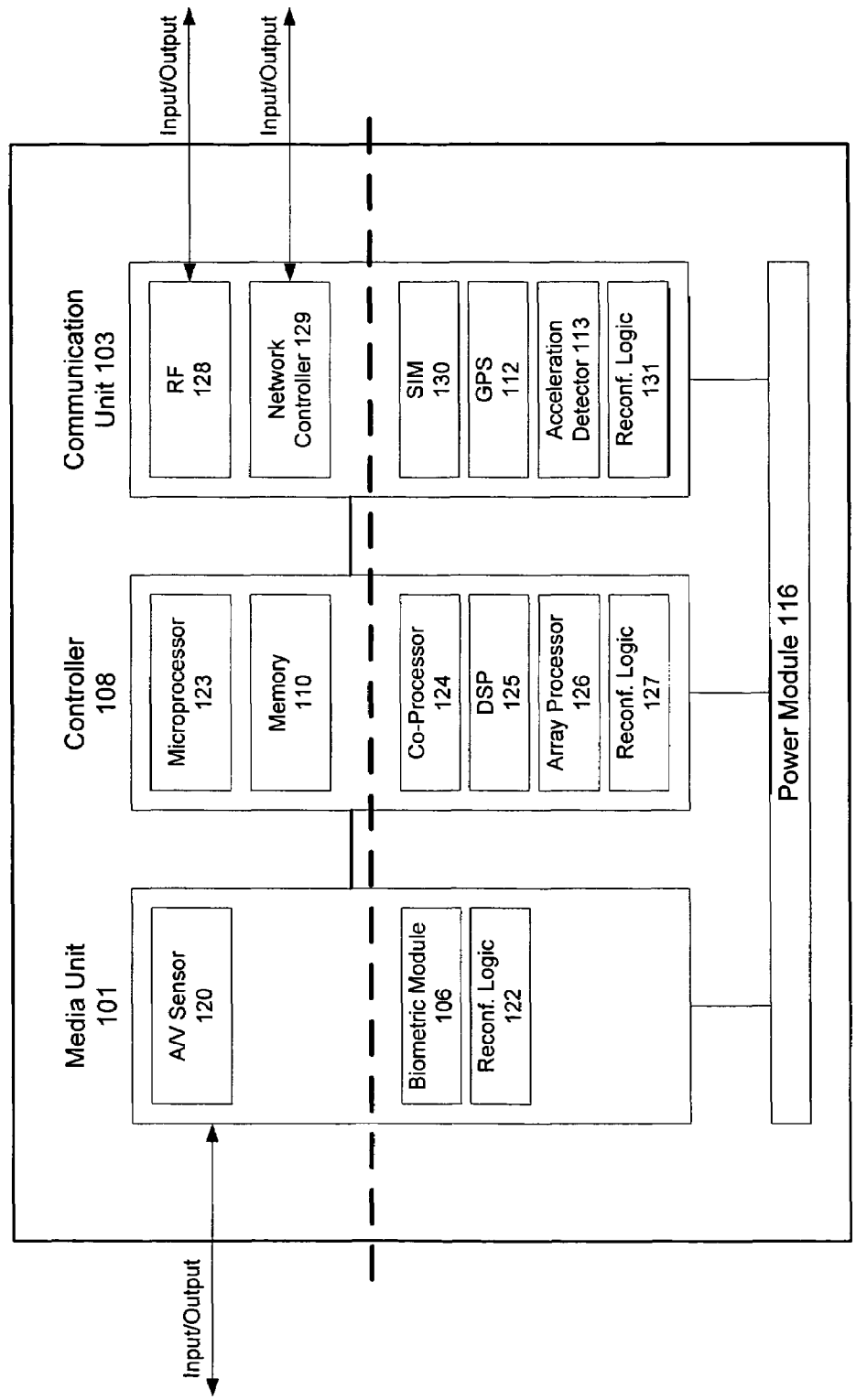
FIG. 1a is an architectural diagram illustrating network-extensible reconfigurable media appliance according to an embodiment of the present invention.

FIG. 1a is an architectural diagram illustrating network-extensible reconfigurable media appliance 100 according to an embodiment of the present invention. Media appliance 100 comprises media unit 101, controller 108, communication unit 103, and power module 116.

Media unit 101 comprises audio and/or video (A/V) sensor 120 for sensing incoming audio and/or video. Sensed video is stored in memory 110 using video format such as Digital Video Disc (DVD), PAL Digital Video Cassette (PAL DVC), PAL or NTSC Laserdisc, 24P HD, ¾-inch, MPEG-2, MPEG-4 (DV-25, DV-50, IMIX, ISMA, etc.), H.264, AVI, DV, DVCAM, DVCPRO, DVCPRO-25/50/100, VHS, D-VHS, W-VHS, Digital-8, Digital-S, D1, D2, D5 HD, Betacam SX, Digital Betacam, other digital ENG format, Motion JPEG, any other HDTV format, NTSC, PAL, HDD/RAID/Disk Arrays, and/or other format for encoding video (specifications for describing these formats are herein incorporated by reference).

Media unit 101 optionally comprises biometric module 106. Biometric module 106 comprises finger-print scanner, retinal scanner, and/or other element for collecting a biometric sample, and stores scanned biometric data and/or result of biometric identification process in memory 110. For example, a data structure is stored comprising a digital representation of collected biometric sample for authorization based on comparison with previously-stored biometric identifier. Biometric module 106 optionally couples with a microarray chip for genetically-based identification.

Media unit 106 optionally comprises reconfigurable logic and/or software 122 for performing programmable audio and/or video sensing, or for conversion to or from audio and/or video formats.

Controller 108 comprises microprocessor 123 (such as one from the Intel Centrino processor family, the specification of which is herein incorporated by reference), and optionally comprises co-processor 124, Digital Signal Processing (DSP) unit 125, array processor 126, and/or reconfigurable logic 127. Controller 108 performs audio and/or video processing on audio and/or video data residing in memory 110. Optionally in real-time manner, controller 108 performs on-the-fly audio processing and/or on-the-fly video processing on incoming encoded audio data and/or incoming encoded video data prior to storage of resulting processed audio data and/or resulting processed video data in memory 110.

Controller 108 is implemented in Application Specific Integrated Circuit (ASIC) blocks, synthesizable intellectual-property cores, cell processors, reconfigurable logic blocks, Field Programmable Gate Arrays (FPGAs), Tensilica's XTensa chip architecture and/or instruction set, Single or Multiple Instruction Single or Multiple Data (S/MIS/MD) architecture signal processing chips, Sony "Cell" chip, and/or other architecture for performing audio and/or video processing.

Controller 108 and/or A/V sensor 120 may perform color-space conversion, brightness, white-balance, backlight compensation, gain control, activity detection, motion detection, motion tracking, gamma correction, sharpening, multi-frame noise reduction, depth estimation, 2-D bad-pixel correction, video compression, video stabilization, digital pan, digital tilt, digital zoom, and/or mosaicing for building panoramic images from successive frames.

Communication unit 103 comprises radio-frequency (RF) transceiver 128 for communicating via radio waves (e.g. over cellular or other wireless network), and/or network controller 129 for communicating via a wired and/or wireless network (e.g. local area network (LAN), wide area network (WAN), wireless fidelity (WiFi) network, etc.).

Communication unit 103 optionally comprises subscriber information module (SIM) unit 130 and/or smart card unit for storage and/or retrieval of information about a user (such as user preference, subscribed service, permission, account information, etc.), and/or for allowing usage of media appliance 100 by one or more users.

Communication unit 103 optionally comprises GPS module 112 for receiving GPS data over satellite. Optionally, GPS module 112 is a micro GPS transponder implemented in single chip or chipset.

Communication unit 103 optionally comprises acceleration detector 113 (such as a gyroscope, a single-chip accelerometer or other element for detecting acceleration) for determining orientation and/or acceleration of media appliance 100.

Communication unit 103 optionally comprises reconfigurable logic or software 131 for performing programmable protocol translation, format conversion, network packet processing, network packet compression and/or decompression, communication encryption and/or decryption, and/or other communication processing.

Power module 116 provides power for media appliance 100, and comprises AC and/or DC source, portable rechargeable battery, fuel cell (e.g. direct methanol fuel cell, etc.), and/or other source for providing electrical power. Optionally, media appliance 100 employs MICA microsensor platform for low-power wireless sensor networks, herein incorporated by reference.

Optionally, media appliance 100 architecture conforms to Advanced Telecommunication Computing Architecture (AdvancedTCA), herein incorporated by reference.

Figure 1B:
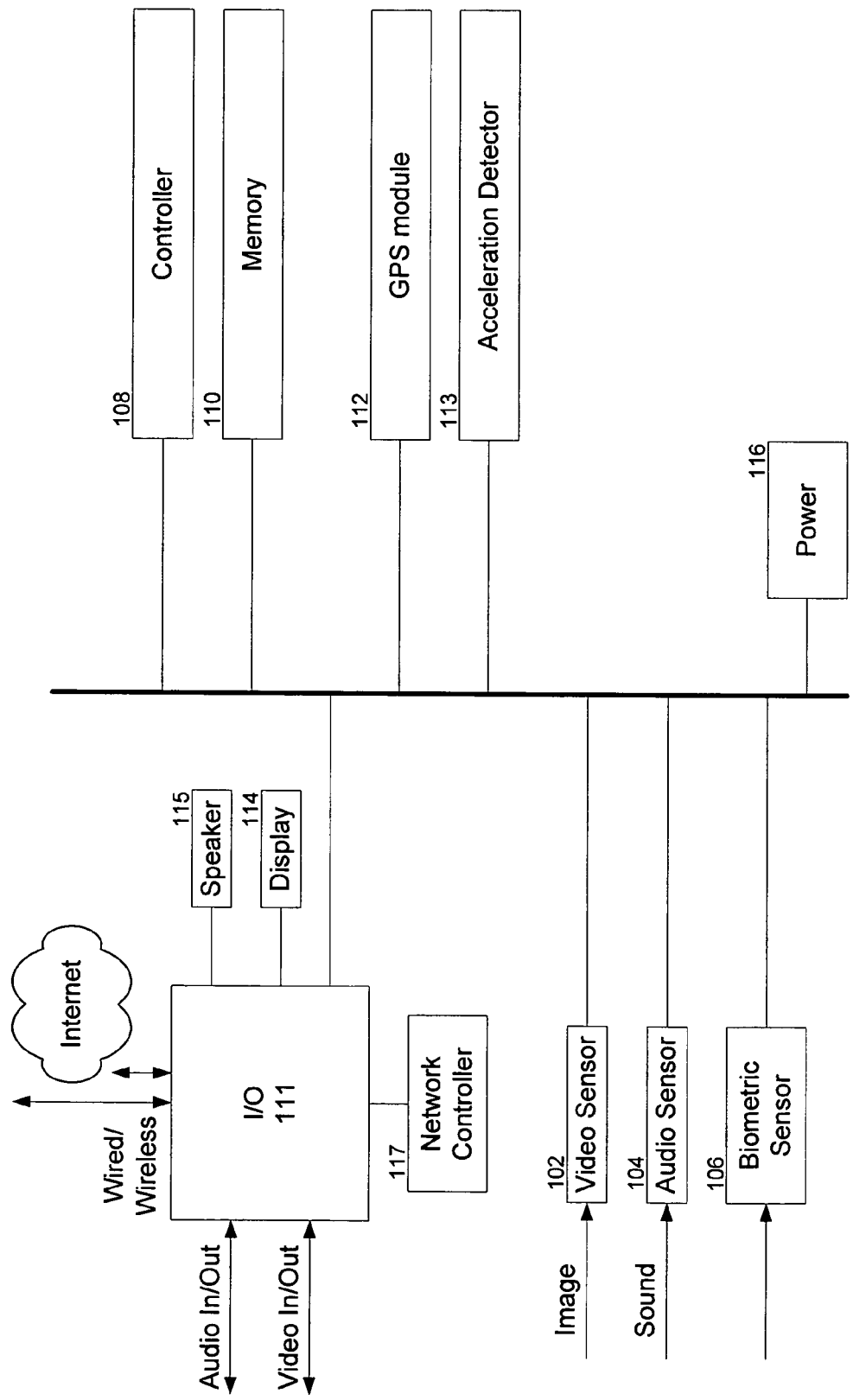
FIG. 1b is an architectural diagram illustrating network-extensible reconfigurable media appliance according to an embodiment of the present invention.

FIG. 1*b* is a diagram illustrating network-extensible reconfigurable media appliance 100 according to one embodiment of the present invention. Light or video sensor 102 senses incoming image stream and stores digital representation in memory 110. Preferably, sensor 102 is a complementary metal oxide semiconductor (CMOS) image sensor. Optionally, sensor 102 is integrated with an image preprocessor. Optionally, sensor 102 comprises integrated two-chip set such as Pixim D1000 or D2000 Video Imaging System chip sets. Sensor 102 optionally comprises a partition for post image processing steps. Alternatively, sensor 102 is a charge-coupled device (CCD) or an Active Pixel Sensor (APS) imager. Audio sensor 104 senses incoming sound and stores digital representation of incoming sound in memory 110 using audio format such as Audio Interchange File Format (AIFF), MPEG Layer 3 (MP3), and/or other format for encoding audio information.

I/O module 111 preferably has audio and video outputs. I/O module 111 preferably communicates with on-appliance display or screen unit 114 and on-appliance speaker 115 for displaying video and generating audio. Optionally, display unit 114 comprises a teleprompter for displaying visual prompts (such as text and/or pictures).

Optionally, I/O module 111 communicates wirelessly, wired, over cellular network, over LAN and/or over WAN (such as Internet), to send and/or receive GPS data, Digital Rights Management (DRM) meta-data, audio and/or video plugins, and/or other instructions and/or data for processing and/or tagging of audio and/or video data. Optionally, I/O module 111 has video and audio inputs for receiving audio and video signals from external audio and/or video source such as a camera, a PDA, a media repository, a satellite, a security service, a DRM service, a biometric service, a GPS service, a PC or workstation, a cellular service or cellular device, or other device or service communicating with media appliance 100. Media appliance 100 optionally has network controller 117 for communicating with other devices and/or services over a network.

Figure 2:
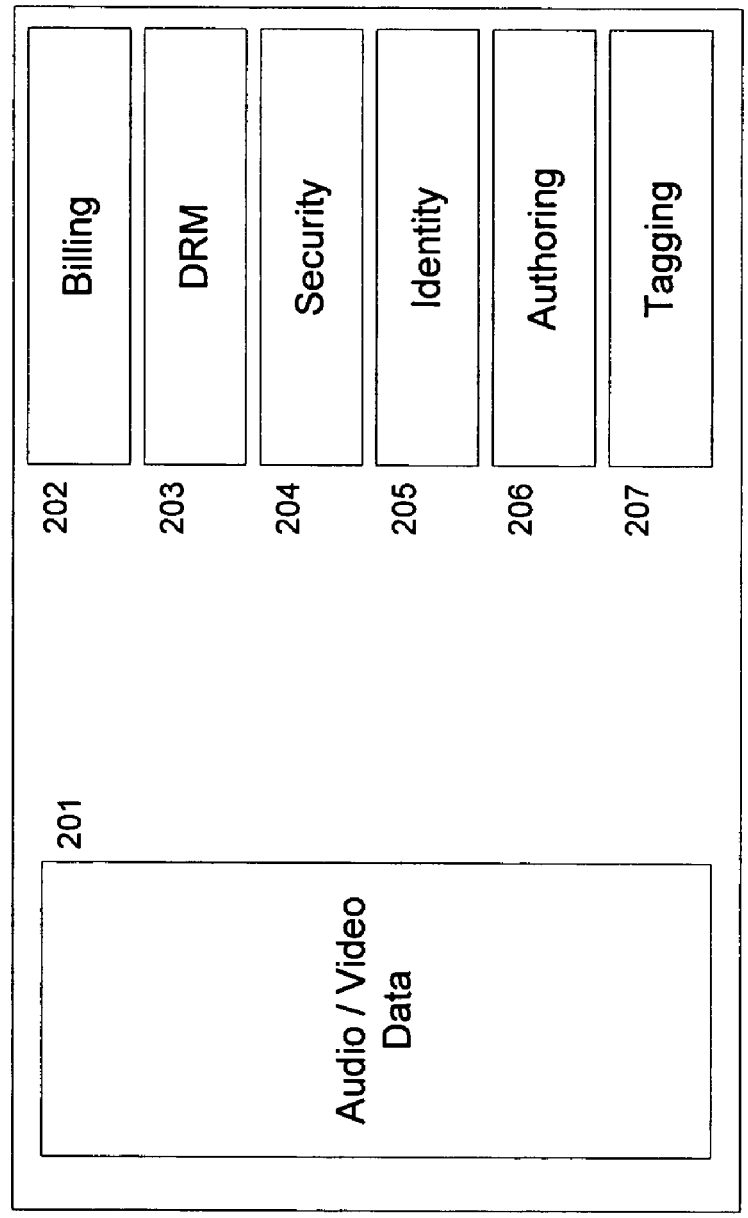
FIG. 2 is a diagram illustrating memory element of network-extensible reconfigurable media appliance according to an embodiment of the present invention.

FIG. 2 shows memory 110 according to a preferred embodiment of the present invention. Memory 110 comprises Dynamic Random-Access Memory (DRAM), Static Random-Access Memory (SRAM), high-speed Flash memory, and/or removable memory (e.g. removable flash memory card such as MultiMediaCard). Memory 110 stores audio and video data 201.

Optionally, memory 110 stores software instructions and data implementing billing 202 and/or business methods, such as a time-based pay-per-view and/or micro-billing feature. For example, memory 110 stores a data structure comprising a field describing a viewing (such as a home-viewing of a video clip of video stream) and/or a field indicating an amount to be charged for the viewing and/or a field identifying a party to be charged.

Optionally, memory 110 stores meta-data and/or instructions for implementing DRM 203 (e.g. Disney Media Asset Management (MAM) format), Resource Definition Framework (RDF) implementation such as Adobe's XMP (eXtensible Metadata Framework), or other scheme for managing meta-data. For example, an XMP packet data structure comprising a header, an XML meta-data, a trailer, and a padding field is employed. Optionally, memory 110 stores data and/or instructions for implementing DRM according to a Right Expression Language Data Model, for example employing Extensible Rights Markup Language (XrML). Optionally, memory 110 stores meta-data and/or instructions for implementing proposed Global Release Identifier Syntax (GRID), for example employing a data structure having an Identifier Scheme, an Issuer Code, a Release Number, and a Checksum.

Optionally, memory 110 stores instructions and/or data 204 for performing digital authentication, encryption, decryption, key generation, digital signing, digital watermarking, and/or other instructions for performing security and/or privacy related computation on audio and/or video data, DRM data, billing data and/or conditions, sensitive personal data, or other data residing in media appliance 100 and/or communicated to or from media appliance 100. For example, memory 110 stores a data structure comprising a field describing an encryption (and/or decryption) key, and further stores instructions for encrypting a video stream using the encryption (and/or decryption) key.

Optionally, memory 110 stores instructions and/or data 205 for performing identity recognition (such as facial recognition, emotion recognition, voice recognition, and/or other pattern or identity recognition) on video data 201 and/or on incoming video signal. For example, memory 110 stores a data structure comprising an identifier for a database against which image recognition is to be performed, for example a database of faces for recognizing faces in a crowd. The database may be stored (partially or completely) internally on media appliance 100 or reside externally on a server. As another example, memory 110 stores a data structure comprising a feature extracted from a video stream and/or video clip (using image extraction instructions stored in memory 110), and the extracted feature is used for a data base query or is sent to a server for further handling.

Optionally, memory 110 stores instructions and/or data for performing authoring 206 and/or digital video editing (e.g. linear or non-linear editing), compositing, and/or special effects, such as Apple's Final Cut Pro software. For example, memory 110 stores a data structure comprising a bit rate associated with the encoding of a video clip and/or video stream. As another example, memory 110 stores a data structure comprising author information, genre information, title, characters, actors, genre, story, activities, viewer demographics, locations, scenes, backgrounds, props, objects, set pieces, or other information pertaining to a video clip and/or video stream.

Optionally, memory 110 stores instructions and/or data for tagging 207 the digital representation of a sensed scene (video stream and/or video clip) with meta-data. For example, memory 110 stores a data structure comprising time, media appliance location (such as provided by GPS module 112), media appliance orientation and/or media appliance acceleration (such as provided by acceleration detector 113), multi-lingual features (allowing for translation, subtitles, voice-over, etc.), cues to a theater automation system (such as instructions for house lights to go up, half-way up, or down, or instructions to open or close curtains, etc.), instructions for allowing or disallowing content (such as trailers or promotional clips) to play next to other similar content, information indicating suitability of content for different audiences such as children, information indicating any promotional offers, products and/or services (such as advertisements, product catalogs and/or coupons for products and/or services), information allowing for organizing and/or managing meta-data available to advertisers and/or service providers, and/or other information describing, identifying and/or relating to content.

DRM meta-data and/or instructions optionally comprise flags for implementing rights and/or limitations of reproduction, rights and/or limitations of public performance, rights and/or limitations of display, rights and/or limitations of distribution, rights and/or limitations of importation, rights and/or limitations of transmission or access, rights and/or provisions under Digital Millennium Copyright Act (DMCA), rights and/or limitations of caching, rights and/or limitations of browsing, rights and/or limitations of storage, rights and/or limitations of transfer such as burning to Compact Disk (CD) or DVD, rights and/or limitations of referring or linking or framing, rights and/or limitations of streaming or downloading, rights and/or limitations of advertising, or other rights and/or limitations and/or provisions. For example, memory 110 stores a data structure comprising a field identifying a video clip or video stream, and a field for indicating whether a reproduction right is granted for the identified video clip of video stream. In another example, memory 110 stores a data structure comprising a field identifying a video clip or video stream, and a field for indicating whether a public performance (and/or display) right is granted for the identified video clip of video stream. Other digital rights can be implemented analogously. DRM meta-data and/or instructions optionally support secure promotion, sale, delivery, distribution, and/or usage tracking of digital content. Optionally, execution environment is partitioned into kernel versus user space and/or into standard versus trusted partitions according to Microsoft's Next-Generation Secure Computing Base (NGSCB).

Media appliance 100 optionally inserts, deletes, and/or modifies a label in an RDF (e.g. XMP) tag describing a media segment.

Media appliance 100 optionally implements content authenticity, device authentication, and/or user authentication. Content authenticity comprises digital watermarking, digital fingerprinting, and/or other technique for content authentication. For example, memory 110 stores instructions for reading an identifier describing a source of a video clip and/or video stream, wherein the identifier is embedded in a digital watermark within the video clip and/or video stream. As another example, memory 110 stores a data structure comprising a field identifying one or more authorized sources for downloading video clips and/or video streams. Device authentication comprises smartcards, public key certificates, and/or device for performing authentication. User authentication comprises biometrics using biometric module 106, passwords, and/or other technique for performing user authentication.

Media appliance 100 optionally implements, in software (e.g. residing in memory 110) and/or hardware, an abstraction layer between application and display, such as DVB (Digital Video Broadcast) and/or MHP (Multimedia Home Platform) abstraction layers. Specifications for incorporating the DVB and MHP formats are herein incorporated by reference.

Figure 3A:
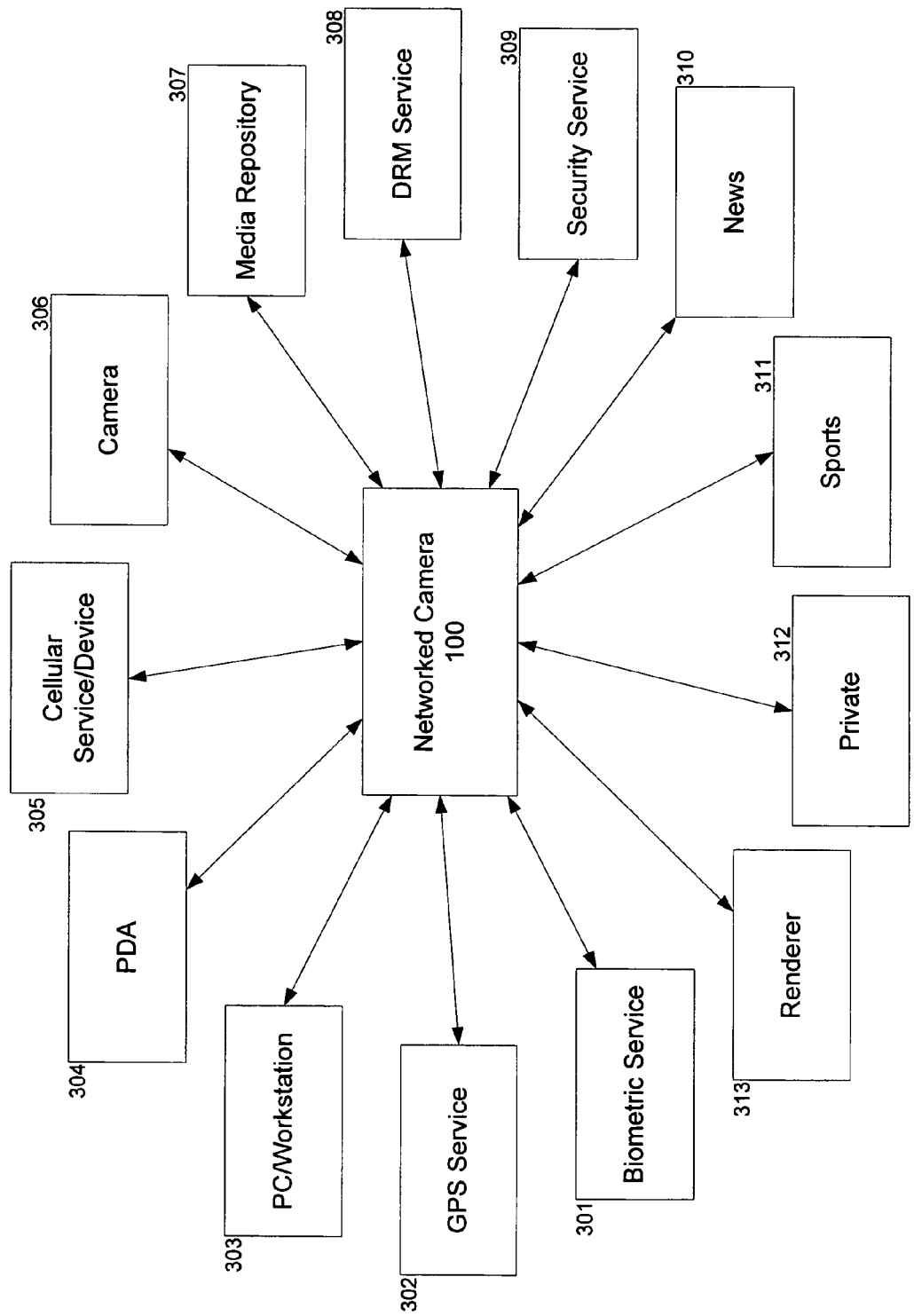
FIG. 3a is a diagram illustrating network-extensible reconfigurable media appliance communicating with other networked services and devices, according to an embodiment of the present invention.

FIG. 3a shows networked media appliance 100 communicating with other device and/or service, according to a preferred embodiment of the present invention. Communication with other device and/or service proceeds via direct network connection, Internet, WiFi, IEEE 802.11, IEEE 802.16, IEEE 802.15.4, ZigBee specification, cellular, Bluetooth, Universal Serial Bus (USB), Apple's FireWire, and/or other communication channel or protocol. Communication is optionally encrypted, authenticated and/or digitally signed, preferably with encryption engine 204 implemented in memory 110, or alternatively with encryption engine 204 implemented in controller 108.

Media appliance 100 optionally communicates with media repository 307 for downloading and/or uploading video and/or audio clips, video and/or audio meta-data such as author information, genre information, title, characters, actors, genre, story, activities, demographics, locations, scenes, backgrounds, props, objects, set pieces, etc.

Media appliance 100 optionally communicates with DRM service 308 for downloading and/or uploading DRM meta-data. Optionally, media appliance 100 generates a message indicating an infringement and/or other violation of digital rights, according to a set of DRM rules, such as copying without permission, broadcasting without permission, etc. For example, memory stores a data structure comprising a field identifying a video clip and/or video stream, and an indicator of a violation of a DRM rule, such as an act of broadcasting the video clip and/or video stream without permission.

Media appliance 100 optionally communicates with security service 309 to upload security information such as video and/or audio record of scene, identity recognition data as computed by identity recognition instructions 203, GPS data as provided by GPS module 112, directional data as provided by acceleration detector 113, and/or to download security information such as location to watch, identity data to store for matching against images, and/or voice audio signature to store for matching against audio clips. For example, media appliance 100 sends a data structure to security service 309, wherein the data structure comprises a field identifying a person, and a field identifying the location of the media appliance 100 at the time the person is sensed by media appliance 100. Optionally, media appliance 100 couples to police authority for providing live and/or recorded footage and/or triggering alarm and calling police according to built-in media appliance intelligence for identifying potential dangerous and/or suspicious conditions.

Media appliance 100 optionally communicates with biometric service 301 to upload biometric information obtained by biometric module 106, and/or to download biometric signature for matching against incoming biometric data.

Media appliance 100 optionally communicates with GPS service 302, such as GPS satellites, to receive GPS information. For example, if media appliance 100 moves into a restricted area, as indicated by GPS service 302 and/or by information residing on media appliance 100 and/or obtained remotely, GPS unit 112 activates an alert. For example, memory 110 stores a data structure comprising a field identifying a restricted geographical area, and media appliance 100 generates an alarm when location of media appliance 100, as indicated by GPS service 302, falls within the restricted geographic area.

Media appliance 100 optionally communicates with news service 310 and/or other objective information service. In one embodiment, media appliance 100 receives a data structure from news service 310, the data structure representing a digital template and comprising a field identifying a location, and one or more fields identifying elements to be covered by reporter (such as a person to interview, a particular place to point out to viewers, other news reporters covering the same news story, etc.).

Media appliance 100 optionally communicates with sports broadcasting network, game-show broadcasting network, and/or other gaming or competition-related network 311. In one embodiment, media appliance 100 receives a data structure from sports broadcasting network 310, the data structure comprising a field identifying one or more competing parties, a field identifying a location of the competition, and a field indicating the competition schedule.

Media appliance 100 optionally communicates with private service 312. In one embodiment, media appliance 100 receives a data structure from movie production source or network 310, the data structure comprising a field identifying one or more movie or media production, a field identifying a location of the production, a field indicating the production schedule, a field indicating one or more scenes, and a field indicating one or more cast or staff members.

Media appliance 100 optionally communicates with renderer 313 to display video data. Renderer 313 comprises a cinema or movie theater, television receiver, computer display, IMAX display, a Digital Audio Broadcast (DAB) broadcaster, a satellite broadcaster, a digital TV, a High Definition TV (HDTV), a PDA and/or cellular phone (or other mobile device display).

Media appliance 100 optionally communicates with a personal computer (PC) and/or workstation 303 and/or other computing device for synchronization of data residing on media appliance 100 with computer 303 (optionally interfacing with media repository manager and/or program manager residing on computer 303). For example, memory 110 stores a data structure comprising a field indicating the time of last synchronization of media appliance 100 with computer 303 (or media repository manager or program manager residing on computer 303). Communication proceeds wirelessly and/or via a cradle (coupled to computer 303) into which media appliance 100 is placed for synchronization. In one embodiment, media appliance 100 comprises a user interface offering a synchronization button (hard button on media appliance 100 and/or soft button displayed in media appliance's 100 graphical display), activation of which causes described data synchronization.

Media appliance 100 optionally communicates with PDA 304, cellular service and/or device 305, and/or other mobile service and/or device for displaying video and/or audio data.

Media appliance 100 optionally communicates with other networked media appliance 306 for exchanging video and/or audio clips and/or for collaborating in the production of a media project, wherein a media appliance is assigned a token (number, string, etc.), statically or dynamically, for identifying the media appliance. Media appliance 100 optionally communicates with other networked media appliance 306 to enable video-conferencing and/or multi-way collaboration, for example, in business meetings, real estate transactions, distance learning, sports, fashion shows, surveillance, training, games, tourism, etc. For example, memory 110 stores a data structure comprising a field for describing a group of collaborating media appliances 100, and a field identifying media appliance 100 itself among the group of collaborating media appliances.

Figure 3B:
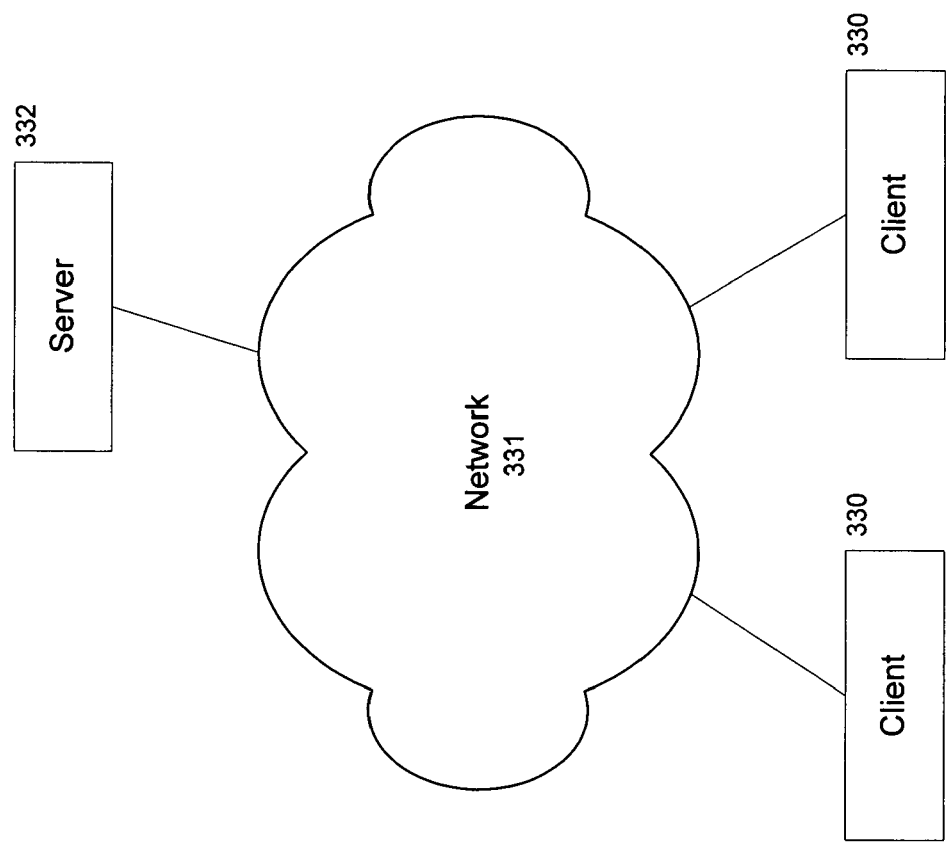
FIG. 3b is a diagram illustrating network-extensible reconfigurable media appliances communicating over a network with a server, according to an embodiment of the present invention.

FIG. 3b is a diagram illustrating network-extensible reconfigurable media appliances communicating over a network with a server, according to an embodiment of the present invention. One or more client media appliances 330 communicate over a network 331 with server 332. Network 331 is a combination of one or more wired and/or wireless networks such as the Internet, a LAN, a WAN, a satellite network, or other network for communication. In one embodiment, server 332 is a news server, having a script or digital template for producing a news program. Server 332 delegates the recording or streaming of various predetermined pieces of audio and/or video footage to the various media appliance clients 330, wherein the recorded or streamed pieces will serve to fill-in the server 332 script or digital template for producing the news program. In another embodiment, server 332 is a server for sports or other competition, having a script or digital template for producing a sports program or a program for other competitive activity. Server 332 delegates the recording or streaming of various predetermined pieces of audio and/or video footage to the various media appliance clients 330, wherein the recorded or streamed pieces serve to fill-in the server 332 script or digital template for producing the sports (or other competition) program.

In one embodiment, I/O module 111 presents a user interface (UI), comprising a combination of hard (physical) buttons and/or soft (graphical) buttons for accessing and using billing functions, DRM functions, authentication, identity recognition, digital editing of media, and/or other services as shown in FIG. 3a and described above. For example, a view (for example comprising a button) is presented via display 114 to allow approval of a billing associated with the viewing of video data. As another example, a view is presented via display 114, allowing selection of one or more audio and/or video data for submission or transmission to a server 332, such as a news server or a sports server, as described above. Selection of a presented audio and/or video data designates the selected data for submission or transmission to the server.

Optionally, interfaces and media appliances are physically separate, wherein through an interface a user can tap into a pool or one or more media appliances to view available audio and/or video data, and/or select one or more available audio and/or video for submission or transmission to a server 332, as described above. As another example, a view is presented at server 332 for approving the inclusion of a submitted or transmitted audio and/or video data into a script or a digital template for a news or sports program, wherein the audio and/or video data is submitted by a media appliance client 330 to server 332, as described above.

Figure 4:
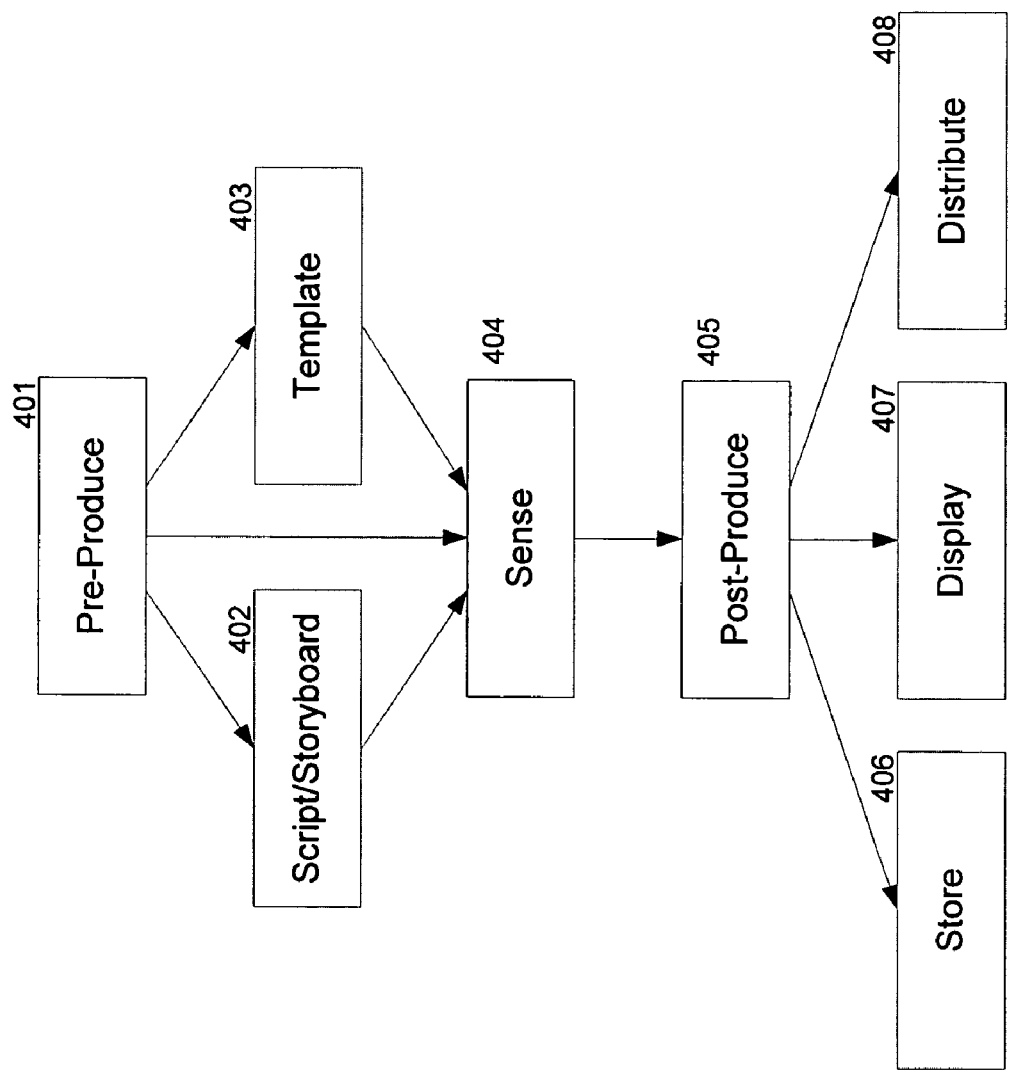
FIG. 4 is a flow diagram illustrating a method for sensing according to an embodiment of the present invention.

FIG. 4 is a flow diagram illustrating a method for sensing according to one embodiment of the present invention. The method begins with pre-production 401. Pre-production comprises employing 402 a script and/or storyboard flowchart, or employing 403 a digital template 403. A portion of this front-end may be implemented automatically or manually in software, comprising analysis, design, development, production, implementation or evaluation of script, storyboard, and/or digital template. Optionally, frames and/or scenes are labeled (via meta-data) according to script, storyboard, or digital template in use.

A script or storyboard is downloaded over a wired and/or wireless network, made available via removable storage (e.g. memory card and/or disk), or is alternatively created on media appliance. A digital template describes how to construct a video and/or multimedia document by sensing (i.e. "shooting" or recording) and assembling individual scenes and/or segments in particular order, and is downloaded over a wired and/or wireless network or created on media appliance. Alternatively, user of media appliance 100 may decide not to consult a script, storyboard, or digital template, and proceed directly to sensing 404.

One example of a template is a template for insurance inspection of vehicle accidents, wherein the template indicates "slots" for video clips, taken from various angles, of the vehicles involved in the accident, as prescribed by an insurance company.

Optionally, media appliance 100 adaptively guides media appliance operator in making discretionary decisions to take alternate script paths and/or alter flow of script (or storyboard or digital template) or generally deviate from the script, for example when dealing with emergency conditions and/or events which do not occur according to script. Such guidance may employ non-deterministic scripts, according to logic specified using Bayesian modeling, neural networks, fuzzy logic, and/or other technique for making decisions under complex conditions and/or under incomplete information. For example, in one embodiment a cast member in a script is described by fuzzy attributes, such as "a female actor with at least five years drama experience" in leading role (instead of or in addition of identifying the lead role actor by name). Then, in case the lead actor canceling her engagement, instructions employing fuzzy logic perform a search for actors matching the fuzzy attributes to dynamically recommend one or more candidates to fill the role.

Optionally, digital template or script is non-linear, allowing for one or more branching points. A branching point allows the script and/or template to flow in more than one path. For example, scene (or clip or stream) A can be followed by scene B or scene C, depending on which branch of the branching point following A is taken. For a viewer, a media presentation prepared according to such non-linear template or script allows for a multiplicity of presentations comprising different scene (or clip or stream) orderings. For a viewer, the decision of which of the alternate paths to follow in a branching point can be viewer selected, randomly chosen, based on external variable (such as a combination of one or more of: weather, temperature, stock quotes, time of day or year, viewing location, amount of money left in viewer's account, or any other external variables), based on biometric sensing of viewer, based on the result of an identity or emotion recognition procedure on viewer (such as distinguishing between happiness, sadness, excitement, apathy, interest in a particular aspect of the presentation and/or other emotions or indications of interest exhibited by viewer), based on real-time input from viewer or from larger audience (such as deliberate viewer decision of which script or template path to take next, provided via an input device or detected by the presentation module), or based on other variables. Such non-linear template or script allows for example for the production and presentation of a PG-rated, R-rated, or X-rated version of a given movie depending on the audience (for example a parent may elect to view the R-rated version of the movie while electing a PG-rated presentation for the children). As another example, a wedding template or script may allow for different presentations based on whether the bride's family or the groom's family is viewing. As another example, a mystery presentation may offer alternate endings, based on viewer input or external variables as described above.

Media appliance 100 senses 404 video and/or audio and stores a digital representation in memory 110. Optionally, multiple audio and/or video streams are sensed, either by the same media appliance or by collaborating media appliances, wherein synchronization is provided for the multiple streams, in the form of meta-data tags describing related scenes and/or streams and/or frames, and/or in the form of meta-data describing time stamps relating different scenes and/or streams. For example, memory 110 stores a data structure comprising one or more fields identifying one or more related video scenes and/or streams and/or frames, and a field indicating the nature of the relation (for example indicating that the video scenes and/or streams and/or frames represented different viewing angles of the same sensed object).

Media appliance 100 then post-produces the stored digital representation, using controller 108 and/or audio or video plugin stored in memory 110.

The post-produced digital representation is then stored 406 in memory 110 (or in other storage medium such as optional on-appliance hard-disk or storage tape for storing data), displayed 407 on on-appliance display unit 114, and/or sent for off-appliance display and/or exhibition (e.g. for IMAX display according to IMAX 15/70 format, or for Texas Instruments DLP (Digital Light Processing) format), or for digital remastering according to IMAX's DMR (Digital Remastering) format, or for satellite distribution (e.g. to Digital Audio Broadcast (DAB) distribution scheme to DAB enabled devices such as PDAs, cellular phones, personal audio and/or video players, or other devices for presenting audio and/or video). Optionally, communication of media appliance 100 with other devices and/or services complies with ATSC DASE (Advanced Television Systems Committee Digital TV Application Software Environment) architecture, incorporated herein by reference.

Figure 5:
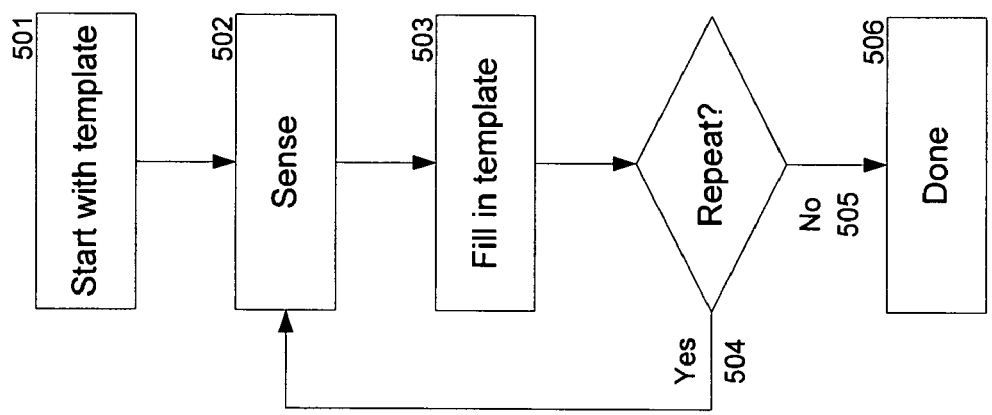
FIG. 5 is a flow diagram illustrating a method for filling in a template according to an embodiment of the present invention.

FIG. 5 is a flow diagram illustrating a method for optionally filling-in a template according to a preferred embodiment of the present invention. Starting 501 with a template, sense 502 a first scene according to the template, and fill-in 503 sensed scene in template. If no additional scene is desired 505, finish 506, else 504 proceed to step 502 and repeat until done. Template is stored in memory 110 comprising suitable format such as the Advanced Authoring Format (AAF).

Figure 6:
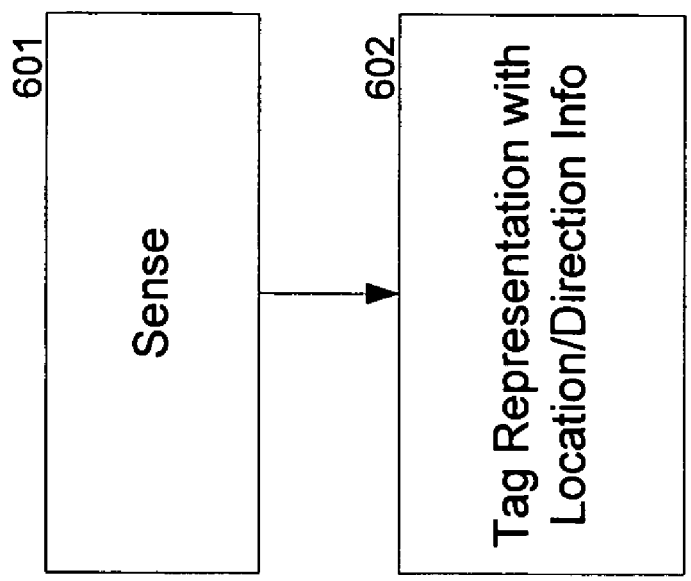
FIG. 6 is a flow diagram illustrating a method for tagging audio and/or video representation with location and/or direction information.

FIG. 6 is a flow diagram illustrating a method for optionally tagging audio and/or video representation with information contained in a meta-data structure. Upon sensing 601 a scene, the digital representation of the sensed scene is tagged 602 with meta-data. Meta-data comprises time, media appliance location (such as provided by GPS module 112), media appliance orientation and/or media appliance acceleration (such as provided by acceleration detector 113), multi-lingual features (allowing for translation, subtitles, voice-over, etc.), cues to a theater automation system (such as instructions for house lights to go up, half-way up, or down, or instructions to open or close curtains, etc.), instructions for allowing or disallowing content (such as trailers or promotional clips) to play next to other similar content, information indicating suitability of content for different audiences such as children, information indicating any promotional offers, products and/or services (such as advertisements, product catalogs and/or coupons for products and/or services), information allowing for organizing and/or managing meta-data available to advertisers and/or service providers, and/or other information describing, identifying and/or relating to content. Tagging may be done per scene, per frame, per audio and/or video stream (e.g. when multiple streams are present), or per other defined segment of audio and/or video. For example, a video scene is tagged with meta-data comprising a field identifying the language used in the video scene. As another example, a video stream is tagged with meta-data comprising a field indicating a warning against viewing by children.

Figure 7:
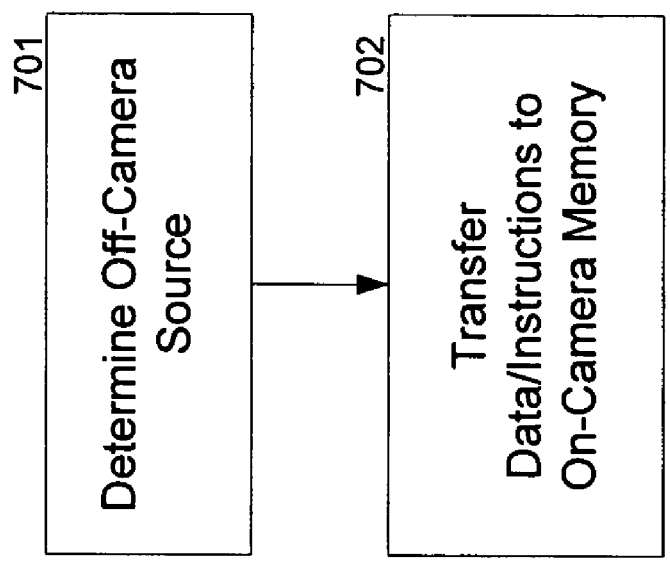
FIG. 7 is a flow diagram illustrating a method for transferring data and/or instructions from off-appliance source to on-appliance memory.

FIG. 7 is a flow diagram illustrating a method for transferring data and/or instructions from off-appliance source to on-appliance memory. After determining 701 off-appliance source, such as external repository (for templates, plugins, DRM data, encryption keys, media clips, security data, biometric data, GPS data, etc.), proceed by transferring 702 data and/or instructions from determined off-appliance source to on-appliance memory 110.

In one embodiment, media appliance 100 is a member of a distributed group of media appliances 100, for example in a distributed network of media appliances 100 and/or in a peer-to-peer configuration of media appliances 100. A media appliance 100 dynamically joins and/or leaves a distributed group of media appliances 100, in parallel and/or serially with other media appliances 100. Alternatively, media appliance 100 initiates a distributed group of media appliances 100, allowing for other media appliance's 100 to dynamically join and/or leave the group. In one embodiment, the group of media appliances 100 collaborates to cover an event, such as a sporting event, a public political event (e.g. a rally), a family event (e.g. a wedding), or other event. Media appliances 100 tag sensed audio and/or video data as described above (e.g. with GPS information, time stamps, DRM meta-data, or other information previously described), allowing reconstruction of covered event from the audio and/or video data collected by distributed media appliances 100. Memory 110 stores instructions and/or data for initiating, joining, leaving and/or querying the status of or information about such a distributed group of media appliances 100.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

I claim:

1. Network-extensible non-linear digital television programming reconfigurable media appliance with storage medium for digitally storing non-linear digital television media program comprising one or more branching points in such program for cellular telephone having non-linear digital television multi-media stream processing applications comprising:

a cell processor comprising a first cell processing unit and a second cell processing unit, such first and second cell processing units enabled to process one or more non-linear digital television programming media streams in serial or parallel using synchronized meta data tags to provide extensible reconfigurable effects studio for cellular telephone or digital television application that produces seamlessly synchronized integration of such processed multiple media streams comprising non-linear digital television programming; and a memory for storing such multi cell processing unit processed multiple media streams, said memory comprising a first media portion partitioned in a kernel space in a storage medium;

and a second media portion partitioned in a user space in the storage medium; a non-linear digital television program being produced electronically via a renderer for audio or video presentation using the first and second portions according to a non-linear digital television programming template or storyboard, such that the digital television program presentation branches or flows from the first portion to the second portion according to the non-linear digital television programming template or storyboard, such non-linear digital television programming branching or flowing enabling a group of network-extensible media appliances comprising one or more cellular telephone or digital television to collaborate to reconstruct a covered event effectively by synchronizing such branching or flowing audio or video presentations that are collected wirelessly from distributed media appliances, such that the group of one or more cellular telephone or digital television media appliances collaborate or synchronize to provide wirelessly network-extensible non-linear digital television programming; the network-extensible reconfigurable media appliance comprising a cellular telephone configured programmably to render non-linear digital television programming using the cell processor and the memory to perform programmable protocol translation, packet processing or format conversion of such rendered non-linear digital television programming.

2. The apparatus of claim 1 wherein the memory further comprising:

a third media portion partitioned in a trusted space in the storage medium, such that the program presentation branches or flows from the first or second portion to the third portion according to the non-linear digital television programming template or storyboard.

3. Network-extensible non-deterministic digital television programming reconfigurable media appliance system with on-appliance memory for accessing non-deterministic digital television media programming for cellular telephone having non-deterministic digital television multi-media stream processing comprising:

a cell processor comprising a first cell processing unit and a second cell processing unit, such first and second cell processing units enabled to process one or more non-deterministic digital television programming media streams in serial or parallel using synchronized meta data tags to provide extensible reconfigurable effects studio for cellular telephone or digital television application that produces seamlessly synchronized integration of such processed multiple media streams comprising non-deterministic digital television programming; and a memory for storing such multi-cell processing unit processed multiple media streams, said memory comprising a first memory element comprising a pre-produced portion; and a second memory element comprising a post-produced portion; such that a news, sports, movie, game, family or political audio or video digital television program is presented electronically using the pre- and post-produced portions according to a non-deterministic digital television programming template or storyboard, such that the digital television program presentation branches or flows from the first portion to the second portion according to the non-deterministic digital television programming template or storyboard, such non-deterministic digital television programming branching or flowing enabling a group of network-extensible media appliances comprising one or more cellular telephone or digital television to collaborate to reconstruct a covered event effectively by synchronizing such branching or flowing program presentations that are collected wirelessly from distributed media appliances, such that the group of one or more cellular telephone or digital television media appliances collaborate or synchronize to provide wirelessly network-extensible non-deterministic digital television programming; the network-extensible reconfigurable media appliance comprising a cellular telephone configured programmably to render digital television programming using the cell processor and the memory to perform programmable protocol translation, packet processing or format conversion of such rendered non-deterministic digital television programming.

4. The system of claim 1 wherein the memory further comprising:

a third memory element comprising a third portion, such that the program presentation branches or flows from the pre- or post-produced portion to the third portion according to the non-deterministic digital television programming template or storyboard.

* * * * *